United States Patent
Begeman et al.

(10) Patent No.: US 10,445,043 B2
(45) Date of Patent: *Oct. 15, 2019

(54) GRAPHICS ENGINE AND ENVIRONMENT FOR EFFICIENT REAL TIME RENDERING OF GRAPHICS THAT ARE NOT PRE-KNOWN

(71) Applicant: Apple Inc., Cupertino, CA (US)

(72) Inventors: Nathaniel C. Begeman, Cupertino, CA (US); Sean M. Gies, Cupertino, CA (US); Andrew M. Pangborn, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/595,270

(22) Filed: May 15, 2017

(65) Prior Publication Data

US 2017/0249117 A1 Aug. 31, 2017

Related U.S. Application Data

(63) Continuation of application No. 15/154,471, filed on May 13, 2016, now Pat. No. 9,679,346.

(Continued)

(51) Int. Cl.
| | |
|---|---|
| *G06T 1/20* | (2006.01) |
| *G06T 1/60* | (2006.01) |
| *G06F 3/14* | (2006.01) |
| *G06F 9/451* | (2018.01) |
| *G06T 15/00* | (2011.01) |
| *G06T 15/50* | (2011.01) |
| *G06T 17/00* | (2006.01) |

(52) U.S. Cl.
CPC ............. *G06F 3/14* (2013.01); *G06F 9/451* (2018.02); *G06T 1/20* (2013.01); *G06T 1/60* (2013.01); *G06T 15/005* (2013.01); *G06T 15/503* (2013.01); *G06T 17/005* (2013.01); *G06T 2200/28* (2013.01)

(58) Field of Classification Search
CPC .................................. G06T 1/20; G06T 1/60
USPC ........................................ 345/501, 522, 545
See application file for complete search history.

(56) References Cited

U.S. PATENT DOCUMENTS

| | | |
|---|---|---|
| 8,310,492 B2 | 11/2012 | McCrary |
| 8,537,169 B1 | 9/2013 | Bolz |

(Continued)

OTHER PUBLICATIONS

International Search Report and Written Opinion received in PCT Patent Application No. PCT/US2016/032452, dated Aug. 12, 2016.

*Primary Examiner* — Jacinta M Crawford
(74) *Attorney, Agent, or Firm* — Blank Rome LLP

(57) ABSTRACT

This disclosure pertains to the operation of graphics systems and to a variety of architectures for design and/or operation of a graphics system spanning from the output of an application program and extending to the presentation of visual content in the form of pixels or otherwise. In general, many embodiments of the invention contemplate a high level graphics framework to receive graphic requests from an application. The graphics request is analyzed by the high-level framework and sorted into groups of command statements for execution. The command statements are sorted to cause the most efficient processing by the underlying hardware and the groups are submitted separately to a GPU using a low-level standard library that facilitates close control of the hardware functionality.

20 Claims, 7 Drawing Sheets

Related U.S. Application Data

(60) Provisional application No. 62/172,113, filed on Jun. 7, 2015.

(56) References Cited

U.S. PATENT DOCUMENTS

| | | |
|---|---|---|
| 8,675,000 B2 | 3/2014 | Labour |
| 8,984,519 B2 | 3/2015 | Cadambi |
| 9,142,004 B2 | 9/2015 | Abiezzi |
| 2002/0063704 A1 | 5/2002 | Sowizral |
| 2010/0013842 A1 | 1/2010 | Green |
| 2013/0057563 A1 | 3/2013 | Persson |
| 2014/0043342 A1 | 2/2014 | Goel |
| 2014/0125672 A1 | 5/2014 | Winternitz |
| 2014/0184623 A1 | 7/2014 | Frascati |
| 2015/0199788 A1 | 7/2015 | Wolfe |
| 2017/0300361 A1 | 10/2017 | Lanka |

| 370 APPLICATION A | 371 PHOTOS | 372 QUICKEN | 373 IMOVIE | 374 APPLICATION B |
|---|---|---|---|---|
| 360 OTHER APPLICATION SERVICES | 361 SPRITE KIT | 362 SCENE KIT | 363 CORE ANIMATION | 364 CORE GRAPHICS |
| 350 O/S SERVICES | 351 OPENGL | 352 METAL | 353 SOFTWARE RAYTRACER | 354 SOFTWARE RASTERIZER |
| O/S KERNEL 345 | | | | |
| HARDWARE 340 | | | | |

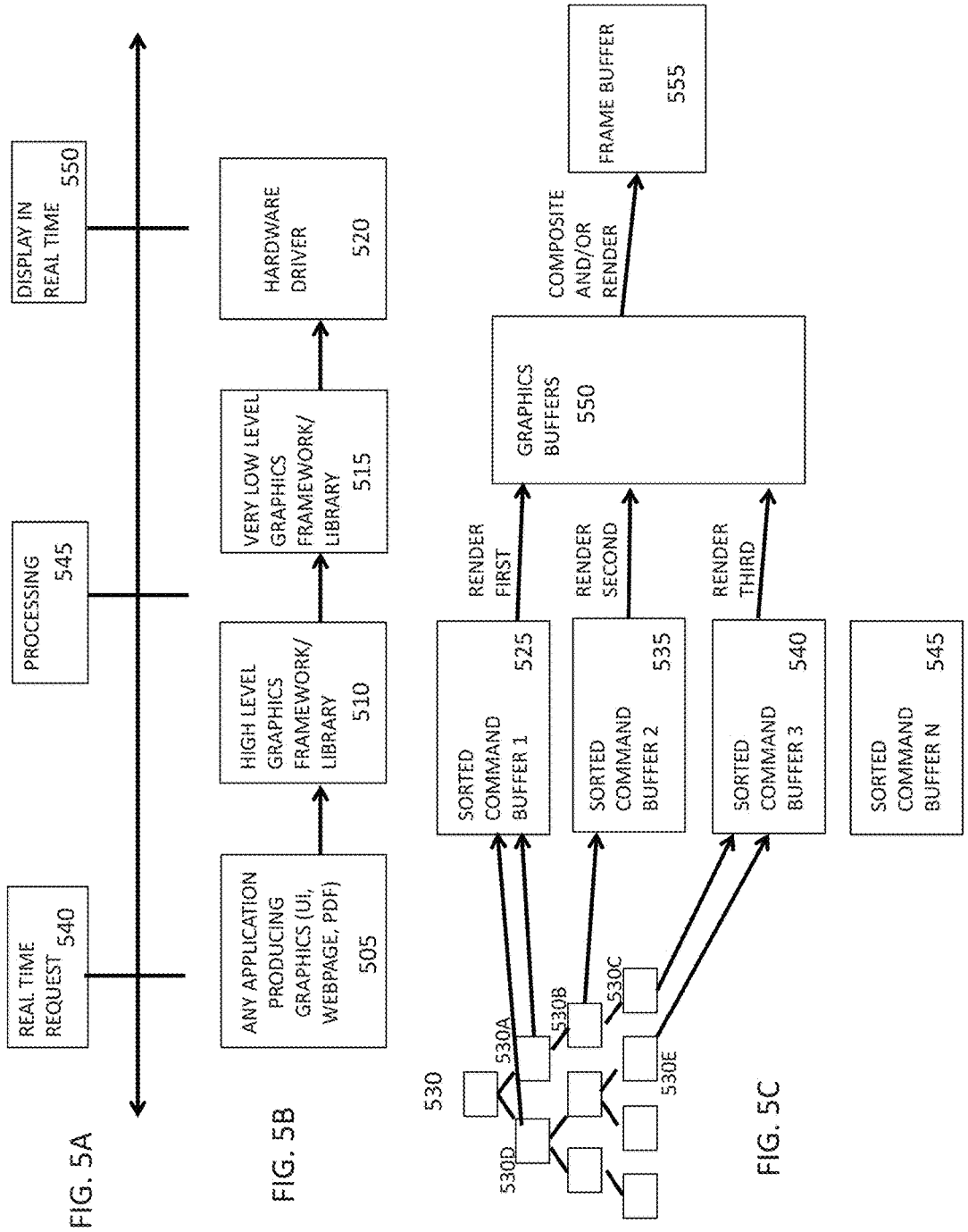

GRAPHICS ENGINE AND ENVIRONMENT FOR EFFICIENT REAL TIME RENDERING OF GRAPHICS THAT ARE NOT PRE-KNOWN

This application is a continuation of U.S. patent application Ser. No. 15/154,471, entitled "Graphics Engine And Environment For Efficient Real Time Rendering Of Graphics That Are Not Pre-Known," filed May 13, 2016, which claims priority to U.S. Provisional Patent Application No. 62/172,113, entitled "Graphics Engine And Environment For Efficient Real Time Rendering Of Graphics That Are Not Pre-Known," filed Jun. 7, 2015, both of which are incorporated by reference herein in their entireties.

BACKGROUND

The inventions disclosed herein relate to the field of graphics processing and, without limitation, the software manipulations that bring graphics requests from an application to the rendering or presenting hardware.

Graphics processor units (GPUs) have become important for processing data-parallel graphics tasks. Developers now recognize that non-graphics data-parallel tasks can also be handled by GPUs, taking advantage of their massive parallel capabilities. Vendors and standards organizations have created application programming interfaces (APIs) that make graphics data-parallel tasks easier to program because of the high level of developer programming interaction. However, there are also low-level APIs (libraries/frameworks, etc.) that reside closer to hardware and are generally employed by applying the output of the higher level APIs. In other words, the higher level APIs generally simply prepare program code for application to the lower level APIs.

The new landscape of graphics processing enables high levels of speed and efficiency. To access these benefits, however, custom programming and other mechanisms are generally required. For example, one standard process for a rendering pipeline begins when an application makes a graphics change resulting in a change to the current scene graph. The application uses a high-level framework/library to effect this change and, from the point of view of the application, the changes are submitted to a rendering service or rendering server. The high-level framework/library then walks the scene graph and issues drawing commands (potentially to a lower-level framework/library) to re-paint the appropriate section of the screen. Thus, the hardware is used to create the new pixels for the screen. However, often several rendering passes may be employed prior to committing content to the frame buffer. The multiple rendering passes are sometimes employed to incrementally move the data toward its displayable form. For example, effects may be sequentially applied to the same graphic element—lighting, shadows, reflections, specular illumination, etc. In addition, multiple rendering passes may be employed for creating pieces or subsets of a single frame to be composited later to form the whole frame. In any event, the use of multiple rendering passes causes latency that can be a factor depending upon the speed of the system and the complexity and rate of change of the graphics. For example, in gaming applications, the extent and complexity of graphics can be very resource demanding. Fortunately, for most gaming applications, the universe of displayable graphics is largely pre-determined. For example, a game application typically knows all the assets, state vectors, and geometries in advance. In other words, when a game loads or a game level loads, the application typically knows the substantial universe of displayable graphics that may be shown by the game. Furthermore, even considering games where the substantial universe is not known, most usually a great majority of the graphics are known in advance. This predetermined knowledge of the displayable graphics allows gaming applications to pre-render graphic pieces and thereby avoid latency issues at runtime—i.e. at the time the graphics are demanded for the screen.

Unfortunately, much of the content used for normal display in a computing environment is not pre-known or pre-determined. For example, normal user interface actions, web pages, and even stored documents like PDFs are generally unknown to the graphics system prior to their first associated graphics request. Sometimes, the graphics are even unknown to the appropriate application (e.g. Acrobat reader does not know the contents of a document until the user opens the document). Furthermore, gaming applications are designed with the notion of heavy graphics in mind, so the applications themselves can help manage the workload and employ non-standard graphical tools and techniques.

SUMMARY

This disclosure relates generally to the field of computer programming. More particularly, but not by way of limitation, it relates to the efficient real-time rendering of graphics that are not pre-known or pre-determined. With respect to these types of graphic assets, many embodiments of the invention break up the rendering task into command statements for execution on graphics hardware such as a GPU. The command statements are then grouped for efficient processing on the hardware. For example, each group may rely on the same GPU state vector so that all the command statements are organized by GPU state. Once the command statements are organized into group, each group may be committed to the hardware and rendered into a buffer memory that is not the frame buffer. Finally, the various results may be composited into the frame buffer for display.

Some embodiments of the invention contemplate a high level graphics framework to receive graphic requests from an application. The graphics request is analyzed by the high-level framework and sorted into groups of command statements for execution. The command statements are sorted to cause the most efficient processing by the underlying hardware and the groups are submitted separately to a GPU. Submission to the GPU may employ a low-level standard library that facilitates close control of the hardware functionality. In this way, standard frameworks may be employed to render graphics that are no pre-determined; and the rendering takes place in a manner that minimizes CPU work (e.g. fewer GPU state changes), adds parallelism and saves power.

BRIEF DESCRIPTION OF THE DRAWINGS

FIG. 3 shows an illustrative software layer and architecture diagram.

FIG. 5A shows an illustrative program sequence.

FIGS. 5B, 5C and 5D show illustrative system architectures.

DETAILED DESCRIPTION

Figure 1:
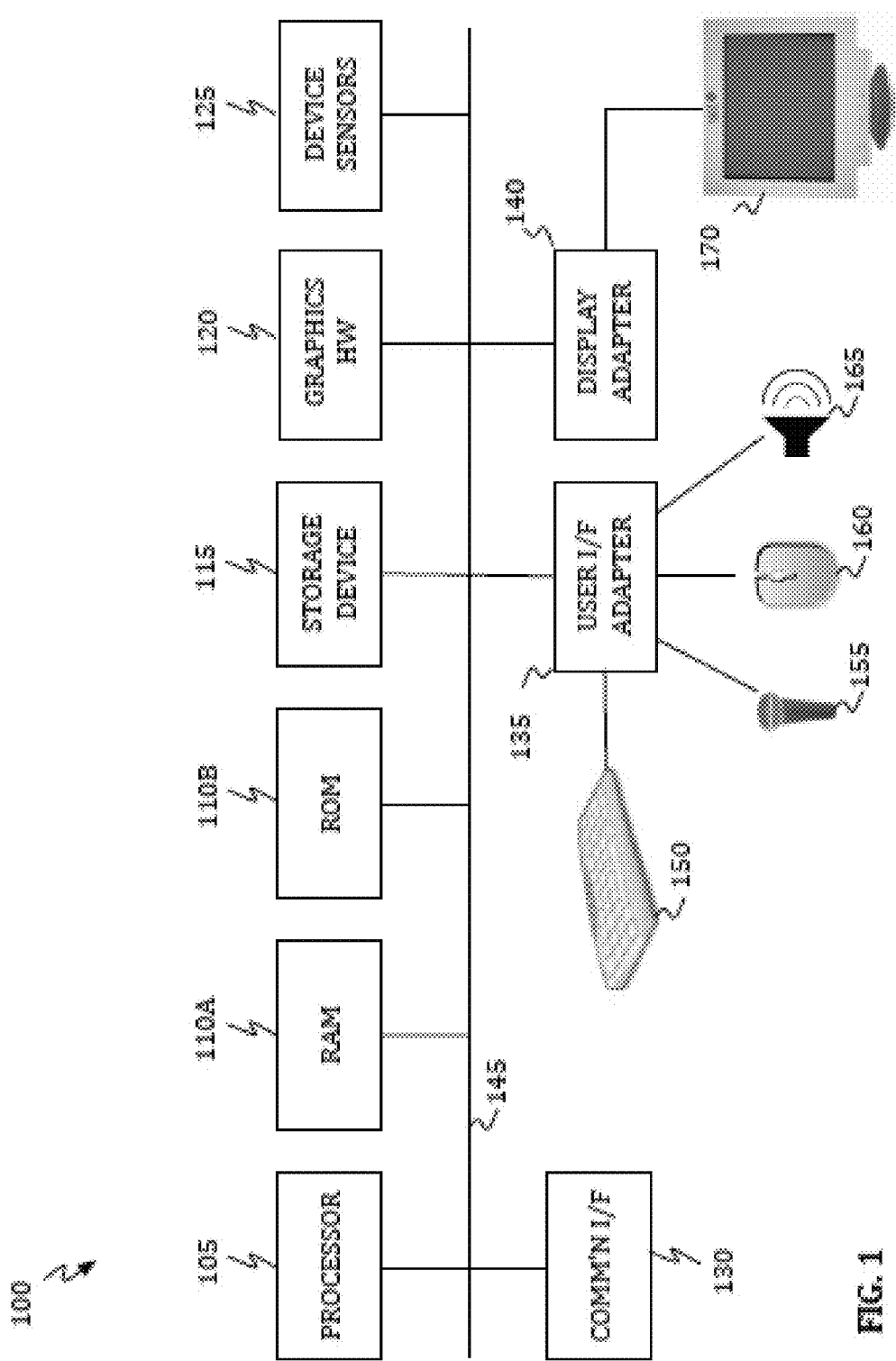
FIG. 1 shows a representative computer node that may be used, for example, as an end-user machine or a developer machine.

This disclosure pertains to systems, methods, and computer readable media to improve the operation of graphics systems. It also pertains to a variety of architectures for design and/or operation of a graphics system starting with an application program and extending to the presentation of visual content in the form of pixels or otherwise. In general, many embodiments of the invention envision a reorganization of on-the-fly graphics program manipulations. In one or more embodiments, the reorganization may use command buffers to group graphics programming portions into groups for efficient execution. Efficiencies may be achieved simply by avoiding system or GPU state changes and/or by ordering groups for execution in a way that prevents unnecessary work by the CPU and other system hardware.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes and may not have been selected to delineate or circumscribe the inventive subject matter, leaving resorting to the claims as a potential necessity to determine such inventive subject matter. Reference in this disclosure to "one embodiment" or to "an embodiment" or "embodiments" means that a particular feature, structure, or characteristic described in connection with the invention is included in at least one embodiment of the disclosed subject matter, and multiple references to "one embodiment" or "an embodiment" should not be understood as necessarily all referring to the same embodiment.

It will be appreciated that, in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nonetheless be a routine undertaking for those having the benefit of this disclosure and being of ordinary skill in the design and implementation of computing systems and/or graphics systems.

Exemplary Hardware and Software

The inventive embodiments described herein may have implication and use in and with respect to all types of devices, including single- and multi-processor computing systems and vertical devices (e.g., cameras, gaming systems, appliances, etc.) that incorporate single- or multi-processing computing systems. The discussion herein is made with reference to a common computing configuration that may be discussed as a software development system or an end user system. This common computing configuration may have a CPU resource including one or more microprocessors. This discussion is only for illustration regarding sample embodiments and is not intended to confine the application of the invention to the disclosed hardware. Other systems having other known or common hardware configurations (now or in the future) are fully contemplated and expected. With that caveat, a typical hardware and software operating environment is discussed below. The hardware configuration may be found, for example, in a server, a workstation, a laptop, a tablet, a desktop computer, a gaming platform (whether or not portable), a television, an entertainment system, a smart phone, a phone, or any other computing device, whether mobile or stationary.

Referring to FIG. 1, the disclosed embodiments may be performed by representative computer system 100. For example the representative computer system 100 may act as a software development platform or an end-user device. System 100 may be embodied in any type of device such as a general purpose computer system, a television, a set top box, a media player, a multi-media entertainment system, an image processing workstation, a hand-held device, or any device that may be coupled with or may incorporate display or presentation devices as discussed herein. Computer system 100 may include one or more processors 105, memory 110 (110A and 110B), one or more storage devices 115, and graphics hardware 120. Computer system 100 may also have device sensors 125, which may include one or more of: depth sensors (such as a depth camera), 3D depth sensor(s), imaging devices (such as a fixed and/or video-capable image capture unit), RGB sensors, proximity sensors, ambient light sensors, accelerometers, gyroscopes, any type of still or video camera, LIDAR devices, SONAR devices, microphones, CCDs (or other image sensors), infrared sensors, thermometers, etc. These and other sensors may work in combination with one or more GPUs, DSPs, or conventional microprocessors along with appropriate programming so the sensor outputs may be properly interpreted and/or combined and interpreted.

Returning to FIG. 1, system 100 may also include communication interface 130, user interface adapter 135, and display adapter 140—all of which may be coupled via system bus or backplane 145. Memory 110 may include one or more different types of media (e.g., solid-state, DRAM, optical, magnetic, etc.) used by processor 105 and graphics hardware 120. For example, memory 110 may include memory cache, read-only memory (ROM), and/or random access memory (RAM). Storage 115 may include one or more non-transitory storage media including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 110 and storage 115 may be used to retain media (e.g., audio, image, and video files), preference information, device profile information, computer program instructions organized into one or more modules and written in any desired computer programming language, and any other suitable data. When executed by processor 105 and/or graphics hardware 120 (also a processor), such computer program code may implement one or more of the methods or processes described herein. Communication interface 130 may include semiconductor-based circuits and may be used to connect computer system 100 to one or more networks. Illustrative networks include, but are not limited to: a local network, such as a USB network; a business's local area network; and a wide area network, such as the Internet; and may use any suitable technology (e.g., wired or wireless). Communications technologies that may be implemented include cell-based communications (e.g., LTE, CDMA, GSM, HSDPA, etc.) or other communications (Ethernet, WiFi, Bluetooth, USB, Thunderbolt, Firewire, etc.). User interface adapter 135 may be used to connect keyboard 150, microphone 155, pointer device 160, speaker 165, and other user interface devices such as a touchpad and/or a touch screen (not shown). Display adapter 140 may be used to connect one or more display units 170 through frame buffers (not shown).

Processor 105 may execute instructions necessary to carry out or control the operation of many functions performed by system 100 (e.g., evaluation, transformation, and graphics work including compilation of graphics programs). Processor 105 may, for instance, drive display 170 and receive user input from user interface adapter 135 or any other user interfaces embodied by a system. User interface adapter 135, for example, can take a variety of forms, such as a button, a keypad, a dial, a click wheel, a keyboard, a display screen, and/or a touch screen. The user interface items or widgets may be generated by the graphics hardware 120 in real time as a user interacts with the interface. Processor 105 may be any type of computing device such as one or more microprocessors working alone or in combination with GPUs, DSPs, and/or system-on-chip devices such as those found in mobile devices. Processor 105 may include one or more dedicated GPUs or graphics subsystems that accept program instructions to create or alter display information such as pixels. In addition, processor 105 may be based on reduced instruction-set computer (RISC) or complex instruction-set computer (CISC) architectures or any other suitable architecture and may include one or more processing cores. Graphics hardware 120 may be special purpose computational hardware for processing graphics and/or assisting processor 105 in performing computational tasks. In some embodiments, graphics hardware 120 may include CPU-integrated graphics and/or one or more programmable GPUs.

Various embodiments of the invention may employ sensors, such as cameras. Cameras and like sensor systems may include auto-focus systems to accurately capture video or image data ultimately used to interpret user intent or commands. Since the motion of the user may be based upon subtle activity in small regions in the captured images (e.g., hands, fingers, face, mouth, brow etc.) the autofocus system may be used to separately focus on multiple regions of the image in order to access better information.

Returning to FIG. 1, sensors 125 may capture contextual and/or environmental phenomena such as time; location information; the status of the device with respect to light, gravity, and the magnetic north; and even still and video images. In addition, network-accessible information, such as weather information, may also be used as part of the context. All captured contextual and environmental phenomena may be used to provide context to user activity or information about user activity. For example, in accessing a gesture or the expression or emotion of a user, the contextual information may be used as part of the analysis. The system 100 may react to environmental and contextual happening and reflect a reaction in real time on the display system through use of the graphics hardware 120.

Output from the sensors 125 may be processed, at least in part, by processors 105 and/or graphics hardware 120, and/or a dedicated image processing unit incorporated within or without system 100. Information so captured may be stored in memory 110 and/or storage 115 and/or any storage accessible on an attached network. Memory 110 may include one or more different types of media used by processor 105, graphics hardware 120, and sensors 125 to perform device functions. Storage 115 may store data such as media (e.g., audio, image, and video files); metadata for media; computer program instructions; and other software; including database applications (e.g., a database storing avatar frames), preference information, device profile information, and any other suitable data. Memory 110 and storage 115 may be used to retain computer program instructions or code organized into one or more modules in either compiled form or written in any desired computer programming language. When executed by, for example, processor 105, such computer program code may implement one or more of the acts or functions described herein (e.g., implementing graphics frameworks and/or facilitating the graphics rendering function).

Figure 2:
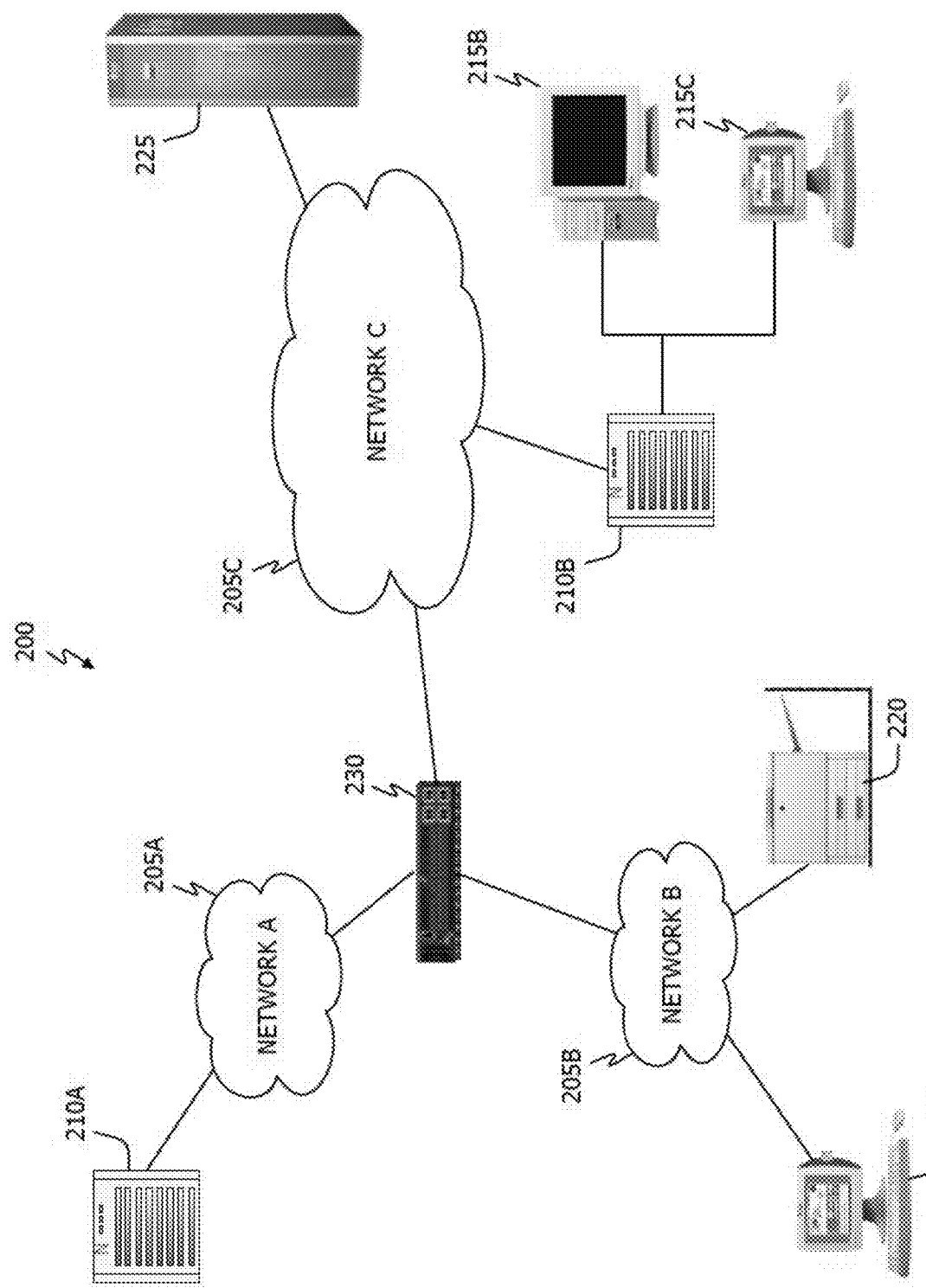
FIG. 2 shows an illustrative network environment that may be associated with one or more embodiments of the invention.

FIG. 2 depicts illustrative network architecture 200, within which the disclosed techniques may be implemented and the disclosed hardware may reside. This illustrative network 200 may include a plurality of networks 205, (i.e., 205A, 205B, and 205C), each of which may take any form including, but not limited to, a local area network (LAN) or a wide area network (WAN), such as the Internet. Further, networks 205 may use any desired technology (wired, wireless, or a combination thereof) and protocol (e.g., transmission control protocol, TCP). Coupled to networks 205 are data server computers 210 (i.e., 210A and 210B) that are capable of operating server applications such as databases and are also capable of communicating over networks 205. One embodiment using server computers may involve the operation of one or more central systems to process graphics information and distribute the processed information to nodes on a network.

Client computers 215 (i.e., 215A, 215B, and 215C), which may take the form of any smartphone, gaming system, tablet, computer, set top box, entertainment device/system, television, telephone, communications device, or intelligent machine, including embedded systems, may also be coupled to networks 205, and/or data server computers 210. In some embodiments, network architecture 210 may also include network printers such as printer 220 and storage systems such as 225, which may be used to store multimedia items or other data that are referenced herein. To facilitate communication between different network devices (e.g., data servers 210, end-user computers 215, network printer 220, and storage system 225), at least one gateway or router 230 may be optionally coupled therebetween. Furthermore, in order to facilitate such communication, each device employing the network may comprise a network adapter circuit and related software. For example, if an Ethernet network is desired for communication, each participating device must have an Ethernet adapter or embedded Ethernet-capable ICs. Further, the devices may carry network adapters for any network in which they might participate (including, but not limited to, PANs, LANs, WANs, and cellular networks).

As noted above, embodiments of the inventions disclosed herein include software. As such, a description of common computing software architecture is provided as expressed in a layer diagram in FIG. 3. Like the hardware examples, the software architecture discussed here is not intended to be exclusive in any way, but rather to be illustrative. This is especially true for layer-type diagrams, which software developers tend to express in somewhat differing ways. In this case, the description begins with layers starting with the base hardware layer 395 illustrating hardware, which may include CPUs and GPUs or other processing and/or computer hardware. Above the hardware layer is the O/S kernel layer 390 showing an example as O/S kernel 345, which is kernel software that may perform memory management, device management, and system calls (often the purview of hardware drivers). The notation employed here is generally intended to imply that software elements shown in a layer use resources from the layers below and provide services to layers above. However, in practice, all components of a particular software element may not behave entirely in that manner.

Returning to FIG. 3, layer 385 is the O/S services layer, exemplified by O/S services 350. O/S services may provide core O/S functions in a protected environment. In addition, O/S services shown in layer 385 may include frameworks for OpenGL 351, Metal 352, Software Raytracer 353, and a Pure Software Rasterizer 354. These particular examples all relate to graphics and/or graphics libraries and are chosen to illuminate the topic of many embodiments herein, which relate to graphics handling. These particular examples also represent graphics frameworks/libraries that may operate in the lower tier of frameworks, such that developers may use shading and graphics primitives and/or obtain fairly tightly coupled control over the graphics hardware. In addition, the particular examples named in layer 385 may pass their work product on directly to hardware or hardware drivers, which is software typically tightly coupled to the hardware.

Referring again to FIG. 3, OpenGL 351 represents an example of a well-known library and application programming interface for graphics rendering including 2D and 3D graphics. Metal 352 also represents a published graphics library and framework, but it is lower level than OpenGL 351, supporting fine-grained, low-level control of the organization, processing, and submission of graphics and computation commands, as well as the management of associated data and resources for those commands. Software Raytracer 353 is software for creating image information based upon the process of tracing the path of light through pixels in the plane of an image. Pure Software Rasterizer 354 refers generally to software used to make graphics information such as pixels without specialized graphics hardware (e.g., using only the CPU). These libraries or frameworks shown within the O/S services layer 385 are only exemplary and intended to show the general level of the layer and how it relates to other software in a sample arrangement (e.g., kernel operations usually below and higher-level Applications Services 360 usually above). In addition, it may be useful to note that Metal 352 represents a published framework/library of Apple Inc. that is known to developers in the art. Furthermore, OpenGL 351 may represent a framework/library present in current versions of software distributed by Apple Inc.

Above the O/S services layer 385 is an Application Services layer 380, which includes Sprite Kit 361, Scene Kit 362 Core Animation 363, and Core Graphics 364. The O/S services layer represents higher-level frameworks that are commonly directly accessed by application programs. In some embodiments of this disclosure the O/S services layer may include graphics-related frameworks that are high level in that they are agnostic to the underlying graphics libraries (such as those discussed with respect to layer 385). In such embodiments, these higher-level graphics frameworks are meant to provide developer access to graphics functionality in a more user/developer-friendly way and to allow developers to avoid work with shading and graphics primitives. By way of example, Sprite Kit 361 is a graphics rendering and animation infrastructure made available by Apple Inc. Sprite Kit 361 may be used to animate textured images, or "sprites." Scene Kit 362 is a 3D-rendering framework from Apple Inc. that supports the import, manipulation, and rendering of 3D assets at a higher level than frameworks having similar capabilities, such as OpenGL. Core Animation 363 is a graphics rendering and animation infrastructure made available from Apple Inc. Core Animation 363 may be used to animate views and other visual elements of an application. Core Graphics 364 is a two-dimensional drawing engine from Apple Inc. Core Graphics 365 provides 2D rendering for applications.

Above the application services layer 380, there is the application layer 375, which may comprise any type of application program. By way of example, FIG. 3 shows three specific applications: photos 371 (a photo management, editing, and sharing program), Quicken 372 (a financial management program), and iMovie 373 (a movie making and sharing program). Application layer 375 also shows two generic applications 370 and 374, which represent the presence of any other applications that may interact with or be part of the inventive embodiments disclosed herein. Generally, embodiments of the invention employ and/or interact with applications that produce displayable/viewable content.

In evaluating O/S services layer 385 and applications services layer 380, it may be useful to realize that different frameworks have higher- or lower-level application program interfaces, even if the frameworks are represented in the same layer of the FIG. 3 diagram. The illustration of FIG. 3 serves to provide a general guideline and to introduce exemplary frameworks that may be discussed later. Furthermore, some embodiments of the invention may imply that frameworks in layer 380 make use of the libraries represented in layer 385. Thus, FIG. 3 provides intellectual reinforcement for these examples. Importantly, FIG. 3 is not intended to limit the types of frameworks or libraries that may be used in any particular way or in any particular embodiment. Generally, many embodiments of this disclosure propose software activity and architecture in the layers between the hardware 340 and application 375 layers, shown by C100.

With reference again to FIG. 3, some embodiments may suggest the use of higher-level frameworks, such as those shown in application services layer 380. The high-level frameworks may perform intelligent analysis on particular graphics requests from application programs. The high level framework may then choose a specific hardware and/or a specific library or low-level framework to help process the request. In these embodiments, the intelligent analysis may provide for on-the-fly decision making regarding the best path for the graphics request to follow down to hardware.

Real Time Display of Content that is not Pre-Determined

Figures 4A, 4B, 4C:
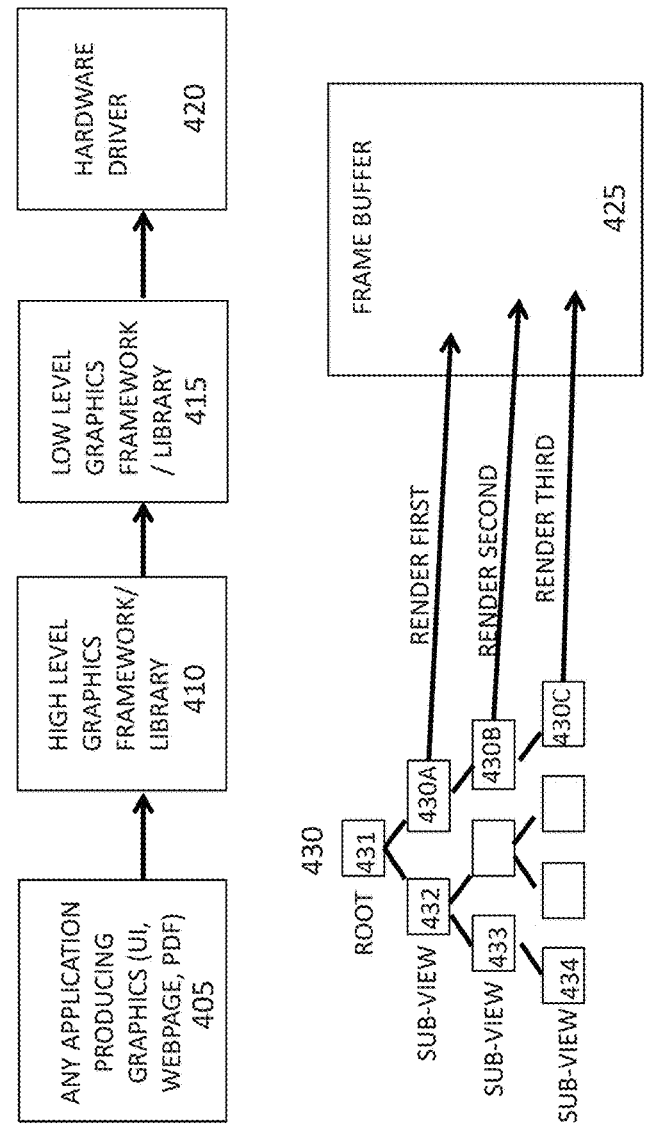
FIG. 4A shows an illustrative program sequence.
FIGS. 4B and 4C show illustrative system architectures.

As discussed above, if displayable content is pre-determined, as in the case of many gaming programs, then there is a significant opportunity for pre-rendering techniques and management that allow the use of more complex and resource intensive graphics at runtime. However, if the displayable content is not pre-known to the graphics system and/or to the origin application program, there is limited latency available for processing a graphics request and committing the result to the screen. With reference to FIG. 4A, a real-time graphics request 440 is made or received regularly in most systems facilitating the use of a display element. The request is real time in the sense that it is made for immediate display and not for storage in a memory or texture or for later display alone as part of a larger arrangement. Given the nature of a real-time request, any time spent processing 445 introduces latency that may or may not be anticipated by the requesting application. For example, if a screen refresh rate is 60 frames per second, then it is desirable for the graphics to produce new frames faster than 60 times each second (approximately every 16.67 milliseconds). The timing is further squeezed on high performance systems, which can refresh the screen at 144 times per second. Thus, referring to FIG. 4B, real-time graphics display leaves a very small amount of time to move through a typical flow from graphics request to display. In a typical case, and in this small amount of time: an application 405 may issue a request; the request may be handled by a high level framework 410 that may interact with the data provided by the application and may manage the movement of the graphics to the screen using a low-level framework 415; finally the low-level framework 415 may pass the request to a hardware driver 420, after which the hardware (e.g., GPU) may process the date and may populate the frame buffer. Of course, there are many software paths to a display element including layers and other frameworks not illustrated in FIG. 4B, but the general software architecture options are well known in the art.

With reference to FIG. 4C, there is shown another conceptual view of graphics processing and the production of pixels for the frame buffer 425. Item 430 represents a scene graph, which is a logical data structure that represents the rendering task for a quantum of graphics. Scene graphs may have a root 431 and sub-views, such as 432 and 430A. As shown in FIG. 4C, sub-views can have their own sub-views and the organization may continue nesting in that fashion. Logical data structures like scene graphs are an efficient and convenient way to represent a graphic, such as the state of the frame buffer 425 or a desired future state of the frame buffer 425. Since application software typically handles graphics at a high level, screen graphs are a common manner to express desired display output.

As described above, when the graphics are not pre-known to the graphics system, there is typically no pre-rendering performed and little organization of the rendering task beyond that represented in the screen graph. For example, when the graphics processing software walks the render tree 430, each node (or renderable item within a node) may be rendered in the order that it is encountered. Thus, for example, node 430A may be rendered prior to node 430B, which may be rendered prior to node 430C (note that, in reality, many implementations may actually begin at the leaf node and work back to the root). By ordering the rendering passes as dictated by the order of the scene graph, the first nodes may be very quickly rendered, but subsequent nodes may suffer some latency due at least to the necessary state changes for the graphics hardware (e.g., the set up and tear down of the GPU for each state required during the walk of the scene graph). GPU state changes are costly in terms of system resources, including both time and energy.

Referring now to FIGS. 5A, 5B and 5C, there is shown an arrangement analogous to FIGS. 4A, 4B, and 4C. In particular, FIG. 5A shows the same sequential processing of real time requests as shown in FIG. 4A. However, FIG. 5B differs from FIG. 4B, in that FIG. 5B shows a "very" low level graphics framework/library at 515. This very low level library may relate to many embodiments of the invention and may offer very granular control of GPU operations. In particular, some embodiments may require a low-level library/framework with one or more of the following capabilities or features: direct control of GPU state vectors; facilitation of direct determination/selection of the command buffers being submitted to hardware (encoding and submission); ability to delay commit actions (e.g., the ability to delay commitment or commit command buffers in parallel); offers a standard library; and/or provides granular control of the GPU (e.g., control of the organization, processing, and submission of graphics and computation commands, as well as the management of the associated data and resources for these commands). In some embodiments, the low-level framework may be or may comprise a standard or published API or library, and in some embodiments, the low-level framework is may be Metal 352. In other embodiments the low-level library may be Mantle or DirectX 12.

The ability to control the GPU closely through a published low-level interface provides advantages that may facilitate a more orderly rendering path for real-time rendering and still allow applications to use a high-level published framework to interface with a system's graphics capabilities. In this respect, referring to FIG. 5C, there is shown a scene graph 530 having nine sub-views organized as shown. The scene graph 530 may be analyzed and GPU commands may be extracted and sorted into multiple command buffers. In some embodiments, the scene graph 530 may be analyzed by a high-level graphics framework (e.g., Scene Kit) and the extracted GPU commands may be expressed in a low-level GPU interface language, such as commands or instructions facilitated by a low-level framework (e.g., Metal). As shown in FIG. 5C, commands may be sorted in any number of buffers, such as sorted command buffers 525, 535, 540, and 545. In particular, as software walks the scene graph 530, commands may be derived from each node and sorted into command buffers 1 to N, represented by command buffers 525, 535, 540, and 545.

In some embodiments of the disclosure, for each graphic surface encountered while descending the scene graph, a GPU command buffer may be allocated. The command buffer may be populated with the correct drawing (e.g., triangles), in the correct order according to the scene graph of all the drawing associated with that surface. In practice, this may involve combinations of vertex pipeline states, vertex data, and textures. For example, a command may be "draw the icon of the home button using two triangles at a designated location using pipeline state 13," which is a combination of vertex shader, fragment shader, blend mode, and GPU index 0. Thus, in these embodiments, the GPU is being directed regarding exactly how to draw the contents of a particular texture. The commands for this drawing may be encoded into the command buffer for the appropriate surface and sorted for most efficient execution.

Varying embodiments of the invention may sort GPU commands (regardless of language) in a manner that provides for easier or more efficient execution. For example, the commands may be sorted according to the required GPU state vector. In this manner, each command buffer may aggregate commands associated with a single GPU state vector such that a reduced number of GPU state changes may be necessary. Furthermore, in certain embodiments, the sequence of submission for multiple command buffers may be arranged to make state changes easier (e.g., by requiring fewer aspects of a state vector to be changed). Thus, tasks requiring a common GPU state may be aggregated (e.g., generating all blurs together, color space transformation, or blending).

In other embodiments, the command sorting may alternatively or additionally contemplate multiple processing resources (e.g., GPUs). Thus, in these embodiments, based upon either the processing task and/or the required GPU state, some commands may be placed in a command buffer sorted for different GPU attributes, such as a higher-power or higher-efficiency. For example, if a system may choose between high-power and high-efficiency GPUs, tasks that require or benefit from higher performance (e.g., to reduce latency) may be sorted to command buffers for the high-power GPU, while tasks requiring less performance may be sorted to command buffers for the high-efficiency GPU. Furthermore, for each applicable GPU, the commands may be further sorted according to required GPU state (i.e., in order to minimize GPU state transitions). In yet other embodiments, command buffers may be sorted based upon the graphic surface, where each command buffer holds commands pertaining to a single graphic surface or a part thereof. In yet other embodiments: commands may be sorted based upon the system state, for example battery life and demand (e.g., more commands sorted to the high efficiency GPU when the battery is below a threshold charge level); commands may be sorted based upon user settings, such as settings for battery life, system temperature, graphics performance, etc.; commands may be sorted based upon sensor output, for example if ambient light is high or backlighting is a factor, then the level of graphics performance may be increased by sorting more commands to a high power GPU; commands may also be sorted to allow for multiple commands to be encoded simultaneously on a multi-CPU system (e.g. and then re-ordered later); commands may also be sorted to allow for multiple commands to be encoded logically simultaneously on a multi-threaded system (e.g. and then re-ordered later); commands may be sorted to decrease latency (to the screen) for one or more particular drawing commands; or, commands may be sorted to improve overall throughput of a group (e.g. a prioritized group) of drawing commands or all drawing command.

After a certain amount of commands are sorted, the command buffers (525, 535, 540, and 545) may be committed for rendering. In many embodiments of the disclosure, the command buffers may be rendered to graphic buffers 550, which represent any suitable memory other than the command buffer. This allows an enter scene graph to be rendered into memory prior to one or more subsequent rendering passes and/or compositing into the frame buffer 555. Other embodiments of the disclosure may provide for rendering directly from the command buffers to the frame buffer.

Some embodiments of the disclosure may provide for intentionally choosing the order of rendering each command buffer. The order may be based upon the ease of GPU state change or any other influential factor, such as the size of a command buffer and the need to free command buffer memory or the operational condition of the GPU (e.g., temperature). In some embodiments, command buffers are populated in an order based (at least in part) upon CPU efficiency (e.g., best use of the CPU resources, potentially including multiple cores). Similarly, once the command buffers (or at least two of the command buffers) are populated, they may be submitted to the GPU resources (e.g. including multiple GPUs) in an order most efficient for the GPU(s), for example allowing more parallelism. Thus, some embodiments optimize CPU efficiency in populating the command buffers and then rendering efficiency (e.g. a rendering correct order) in submitting the command buffers for rendering.

Figure 5D:
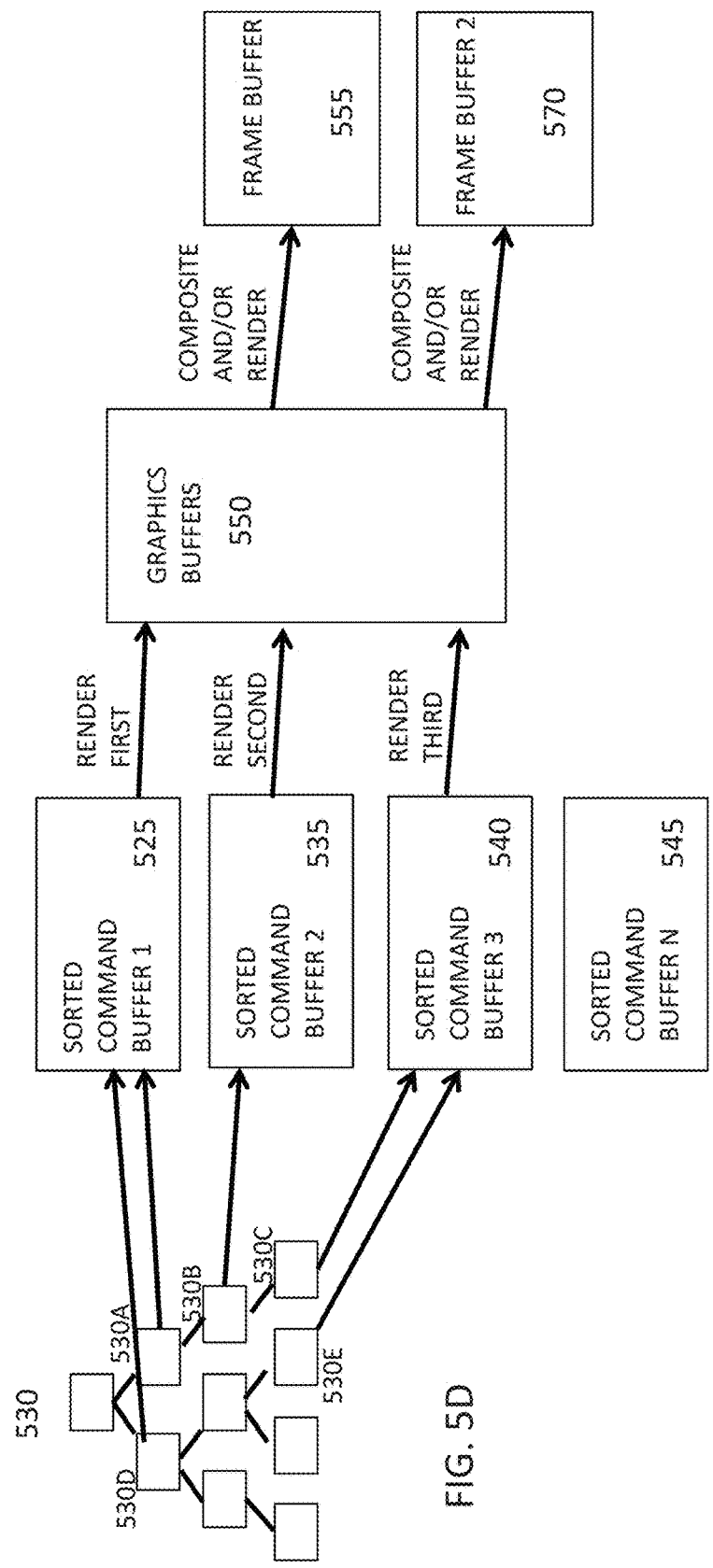

As noted above, some embodiments of the disclosure may contemplate sorting commands into command buffers according to a destination hardware device such as a GPU. FIG. 5D illustrates this situation. Referring to FIG. 5D, the command buffers (525, 535, 540, and 545) may contain commands sorted according to GPU identity and GPU state. For example, command buffers 525 and 535 may be sorted for a first GPU, where command buffer 525 may represent a first state of the first GPU while command buffer 535 may represent a second state of the first GPU. Moreover, command buffers 540 and 545 may be sorted for a second GPU, where command buffer 540 may represent commands for a first state of the second GPU and command buffer 545 may represent commands for a second state of the second GPU. Depending upon the system configuration, both GPUs may render into the same frame buffer (e.g., frame buffer 555), or, in some embodiments (e.g., with multiple displays), graphics may be rendered into separate frame buffers as exemplified in FIG. 5D. For example, command buffers 525 and 535 may be sorted for a first GPU associated with frame buffer 555 while command buffers 540 and 545 may be sorted for a second GPU associated with frame buffer 570.

Differing embodiments of the disclosure contemplate committing each command buffer under differing circumstances. In some embodiments, a command buffer may be committed only after a scene graph has been completely walked/evaluated. In other embodiments, a command buffer may be committed when there are no further commands from the scene graph representing a certain GPU state vector (or when the software believes there is a high probability of the same). Likewise, a command buffer may be committed when there are no further commands for a certain GPU (or when the software believes there is a high probability of the same). Moreover, a command buffer may be committed when, for a certain GPU that is the target of the command buffer, there are no further commands associated with a specific GPU state vector (or when the software believes there is a high probability of the same). In addition, command buffers may be committed based upon their size measured either in the memory they consume or the size of the processing task they represent. Finally, any combination of the foregoing reasons may be used to decide when to commit a command buffer.

Exemplary Process

Figure 6:
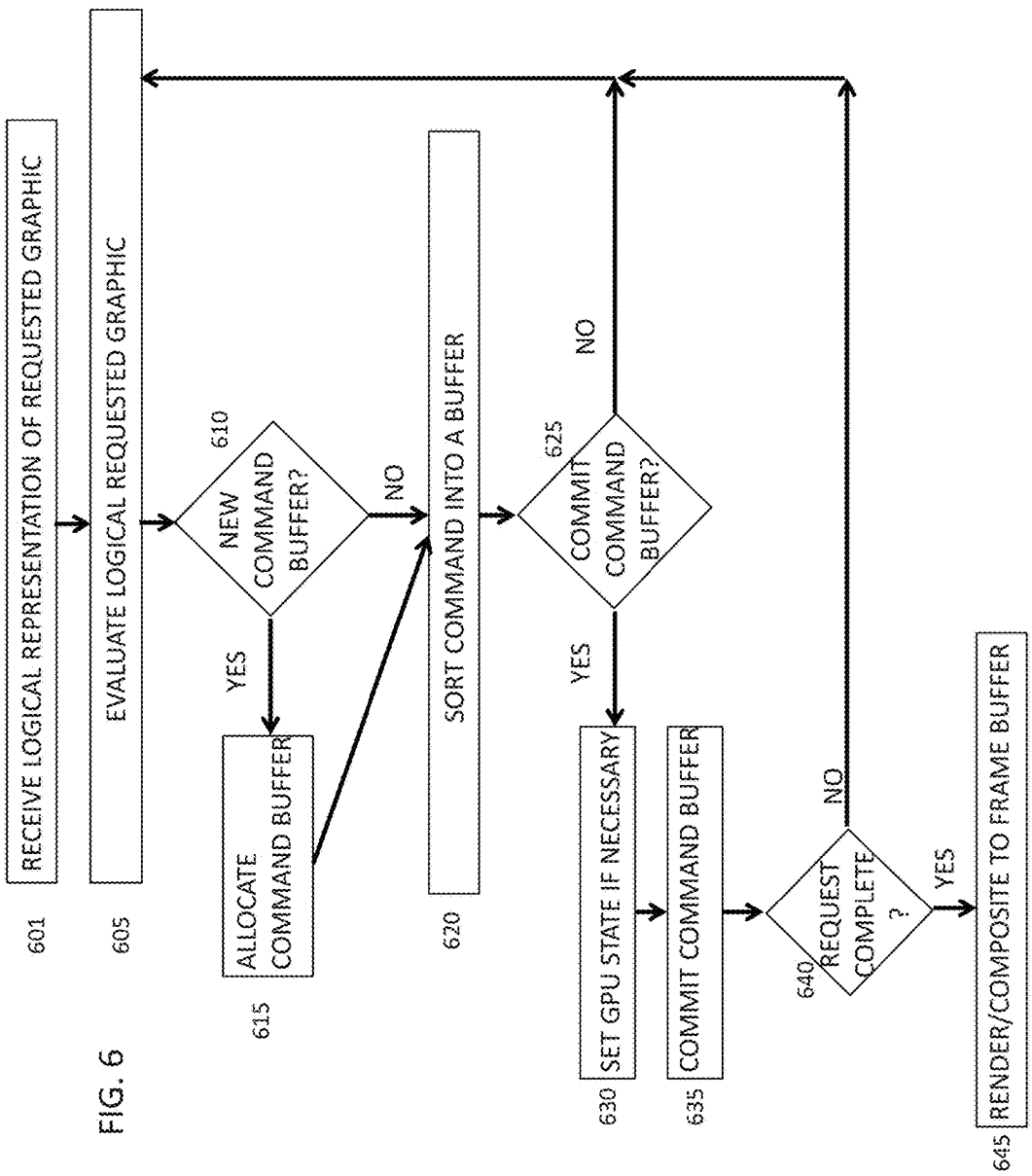
FIG. 6 shows illustrative processes.

Referring to FIG. 6, there is shown a flow diagram intended to illustrate many embodiments of the disclosure. In particular, at 601 a logical representation of a requested graphic may be received. In some embodiments, the logical representation may be a scene graph. As discussed above, a scene graph is a general data structure commonly used by vector-based graphics editing applications and modern computer games, which arranges the logical and often (but not necessarily) spatial representation of a graphical scene. Scene graphs define the displayable content being requested by an application so, generally, the scene graph has an organization for the benefit of the application—not the graphics system.

In many embodiments of the disclosure, the received graphics request may be a real time request, meaning the graphic is for immediate display on a display element of a host system. In other words, the pre-rendering performed as part of the process of FIG. 6 is not regarding pre-known or pre-determined graphics for later possible display. It is for immediate display of graphics that were not pre-known to the graphics system.

Referring again to FIG. 6, at 605 the logical representation may be evaluated and one or more graphic commands may be extracted. For each extracted command, a decision may be made regarding sorting the command into a group of commands for execution together. As discussed above, the purpose of sorting commands is so that groups of commands may be submitted to the GPU (or other hardware) in an order or sequence that is most desirable or efficient for the system, and not simply easiest for the expression of the application.

Referring again to FIG. 6, at 610 it may be determined whether a new command buffer is required to hold a particular sorted command. If an appropriate command buffer already exists then a new command buffer may not be required. If there is no appropriate command buffer, then at 615 a new command buffer may be allocated. In some embodiments, new command buffers may be allocated for each graphic surface encountered in the logical representation of the requested graphic. In other embodiments, command buffers may be allocated for separate GPU states required by the requested graphic or for each target GPU (or in any manner as discussed above, including a combination of GPU state and target GPU identity).

Referring again to FIG. 6, at 620, one or more commands may be sorted into one or more command buffers appropriate for each command. For example, if at 610 there was a determination that an existing command buffer was appropriate for a given command, then at 620, the given command would be sorted into that existing command buffer. Alternatively, if at 610 there was a determination that no appropriate command buffer exists for a certain command, then a 615 a new command buffer would be allocated and at 620 the certain command would be sorted into the new command buffer.

Referring again to FIG. 6, at 625 a decision may be made whether or not to commit the command buffer for rendering. If the command buffer is not ready to be committed for rendering, the process may return to 605 and continue evaluation of the logical representation of the requested graphic. This decision regarding when to commit a command buffer is discussed above but may often relate to whether there are more commands expected for the buffer and/or whether memory constraints are a factor.

If at 625 there is a decision to commit the command buffer for rendering, then at 630 the target GPU may be set up for rendering the command buffer. For example, if the state of the target GPU requires alternation, those alterations may be made at 630.

Once the hardware is prepared at 630, the command buffer may be committed to render at 635. As discussed above, many embodiments of the disclosure may render to memory buffers but not immediately to the frame buffer. This type of deferred rendering or compositing allows the graphics system to wait for a desired quantum of pre-rendering to take place before compositing and/or submitting to the frame buffer for display. Importantly, in varying embodiments and through the use of high-level or low-level frameworks, the control of this delay may be either placed in the hands of the application developer or, perhaps more conveniently, automatically handled by a high-level framework. For example, a high-level framework may elect to organize rendering by generating all lighting information together, and/or by generating all depth information together, and/or by drawing all trees together using a common state vector, and/or by drawing all rocks together using a common state vector, etc. This organization by the high-level framework may occur even though the graphic request is for real time presentation and the scene graph presents the information in an arbitrary or inconvenient order. After organizing and grouping the commands, the high-level framework may submit the command buffers for rendering through a low-level framework as discussed above.

Referring again to FIG. 6, at 640 a determination may be made whether the requested graphic has been completely submitted for rendering. If portions of the requested graphic remain unrendered/uncommitted then there may be a return to 605 and a continued evaluation of the logical representation of the requested graphic. In some instances or embodiments, a return all the way to 605 may be unnecessary because the full graphic/scene graph may be completely evaluated although lower portions of the process may be incomplete. In these instances, the return from decision block 640 may be to any prior point where work remains to complete the rendering of the graphic.

Referring again to FIG. 6, at 645, if all pre-rendering is complete, then the pre-rendered components may be composited into the frame buffer for display on a target display element.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., many of the disclosed embodiments may be used in combination with each other). In addition, it will be understood that some of the operations identified herein may be performed in different orders. The scope of the invention, therefore, should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method comprising:
receiving a logical representation of a requested graphic for display on a display element of a computer system, wherein the requested graphic comprises portions that have not been pre-rendered;
evaluating the logical representation of the requested graphic to derive a plurality of statements representing commands to a target hardware, wherein the plurality of statements represents portions of the requested graphic that have not been pre-rendered;
sorting the plurality of statements into two or more groups of statements, wherein each group of statements represents statements having a commonality, the commonality comprising one of:
requiring a common graphics processing unit (GPU) state,
requiring a common target GPU in a system having multiple GPUs, or
each statement being associated with a common graphic surface;
determining if a first group of statements of the two or more groups of statements is ready for rendering;
committing a first command buffer that includes the first group of statements for rendering if it is determined that the first group of statements is ready for rendering;
determining if a second group of statements of the two or more groups of statements is ready for rendering;
committing a second command buffer that includes the second group of statements for rendering if it is determined that the second group of statements is ready for rendering; and
compositing contents of the first command buffer and the second command buffer into a frame buffer for display on the display element.

2. The method of claim 1, wherein the logical representation of a requested graphic comprises a scene graph.

3. The method of claim 1, further comprising rendering the first command buffer into a first graphic buffer and the second command buffer into a second graphic buffer, wherein the first graphic buffer and the second graphic buffer are part of a same physical memory.

4. The method of claim 1, wherein each group of statements resides in separate command buffers.

5. The method of claim 1, wherein determining if the first group of statements is ready for rendering comprises one or more of:
  determining if further statements will be added to the first group of statements;
  determining if computer system memory is constrained;
  determining if evaluation of the logical representation of the requested graphic is complete; or
  determining if all aspects of the logical representation of the requested graphic that require pre-rendering have been pre-rendered.

6. The method of claim 1, wherein evaluating the logical representation is performed through application calls to a high-level graphics library.

7. The method of claim 1, wherein sorting the plurality of statements into two or more groups of statements comprises sorting the plurality of statements into two or more command buffers.

8. The method of claim 7, wherein the two or more command buffers are submitted sequentially in an order that minimizes changes to aspects of a GPU state vector.

9. A non-transitory program storage device, readable by a processor and comprising instructions stored thereon to cause one or more processors to:
  receive a logical representation of a requested graphic for display on a display element of a computer system, wherein the requested graphic comprises portions that have not been pre-rendered;
  evaluate the logical representation of the requested graphic to derive a plurality of statements representing commands to a target hardware, wherein the plurality of statements represents portions of the requested graphic that have not been pre-rendered;
  sort the plurality of statements into two or more groups of statements, wherein each group of statements represents statements having a commonality;
  determine if a first group of statements of the two or more groups of statements is ready to be rendered;
  commit a first command buffer that includes the first group of statements for execution on the target hardware if it is determined that the first group of statements is ready to be rendered;
  determine if a second group of statements of the two or more groups of statements is ready to be rendered;
  commit a second command buffer that includes the second group of statements for execution on the target hardware if it is determined that the second group of statements is ready to be rendered; and
  composite contents of the first command buffer and the second command buffer into a frame buffer for display on the display element.

10. The non-transitory program storage device of claim 9, wherein the commonality comprises one of:
  requiring a common graphics processing unit (GPU) state,
  requiring a common target GPU in a system having multiple GPUs, or
  each statement being associated with a common graphic surface.

11. The non-transitory program storage device of claim 9, wherein the instructions further cause the one or more processors to:
  render the first command buffer and the second command buffer into a plurality of graphic buffers; and
  composite contents stored in the plurality of graphic buffers into the frame buffer.

12. The non-transitory program storage device of claim 9, wherein each group of statements resides in separate command buffers.

13. The non-transitory program storage device of claim 9, wherein the instructions to cause the one or more processors to determine if a first group of statements is ready to be rendered comprise instructions to cause the one or more processors to determine one or more of the following:
  if further statements will be added to the first group of statements;
  if computer system memory is constrained;
  if evaluation of the logical representation of the requested graphic is complete; or
  if all aspects of the logical representation of the requested graphic that require pre-rendering have been pre-rendered.

14. The non-transitory program storage device of claim 9, wherein the instructions to cause the one or more processors to evaluate the logical representation comprise instructions to cause the one or more processors to issue application calls to a high-level graphics library.

15. The non-transitory program storage device of claim 9, wherein the instructions to cause the one or more processors to sort the plurality of statements into two or more groups of statements comprise instructions to cause the one or more processors to sort the plurality of statements into two or more command buffers.

16. The non-transitory program storage device of claim 15, wherein the two or more command buffers are submitted sequentially in an order that minimizes changes to aspects of a GPU state vector.

17. A system comprising:
  one or more central processing units (CPUs);
  one or more graphics processing units (GPUs) configured to process a graphics request; and
  one or more memories configured to store program instructions for the one or more CPUs and the one or more GPUs, where certain instructions, when executed, cause the one or more CPUs or the one or more GPUs to:
    receive a logical representation of a requested graphic for display on a display element of a computer system, wherein the requested graphic comprises portions that have not been pre-rendered;
    evaluate the logical representation of the requested graphic to derive a plurality of statements representing commands to a target hardware, wherein the plurality of statements represents portions of the requested graphic that have not been pre-rendered;
    sort the plurality of statements into two or more groups of statements, wherein each group of statements represents statements having a commonality;
    determine if a first group of statements of the two or more groups of statements is ready to be rendered;
    commit a first command buffer that includes the first group of statements for rendering if it is determined that the first group of statements is ready to be rendered;
    determine if a second group of statements of the two or more groups of statements is ready to be rendered;
    commit a second command buffer that includes the second group of statements for rendering if it is determined that the second group of statements is ready to be rendered; and
    composite contents of the first command buffer and the second command buffer into a frame buffer for display on the display element.

18. The system of claim 17, wherein the commonality comprises one of:
  requiring a common GPU state;
  requiring a common target GPU in a system having multiple GPUs; or
  each statement being associated with a common graphic surface.

19. The system of claim 18, wherein command buffers are submitted sequentially in an order that minimizes changes to aspects of a GPU state vector.

20. The system of claim 17, wherein the instructions to cause the one or more CPUs or the one or more GPUs to evaluate the logical representation comprise instructions to cause the one or more CPUs or the one or more GPUs to issue application calls to a high-level graphics library.

\* \* \* \* \*